United States Patent
Radcliffe et al.

(10) Patent No.: US 8,611,010 B2
(45) Date of Patent: Dec. 17, 2013

(54) SUBSTRATE COMPRISING UNMATCHED REFRACTIVE INDEX PRIMER AT OPTICALLY SIGNIFICANT THICKNESS

(75) Inventors: Marc D. Radcliffe, Newport, MN (US); Christopher P. Tebow, Woodbury, MN (US); Christopher B. Walker, Jr., St. Paul, MN (US); Mark J. Pellerite, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1066 days.

(21) Appl. No.: 12/241,310

(22) Filed: Sep. 30, 2008

(65) Prior Publication Data

US 2010/0079866 A1   Apr. 1, 2010

(51) Int. Cl.
*G02B 1/10* (2006.01)
(52) U.S. Cl.
USPC .......................................................... 359/586
(58) Field of Classification Search
USPC ........... 359/580, 581, 586, 589; 349/104, 105
See application file for complete search history.

(56) References Cited

U.S. PATENT DOCUMENTS

| | | | |
|---|---|---|---|
| 3,624,034 A | 11/1971 | Price et al. | |
| 3,734,874 A | 5/1973 | Kibler et al. | |
| 3,779,993 A | 12/1973 | Kibler et al. | |
| 3,821,281 A | 6/1974 | Radlmann et al. | |
| 4,052,368 A | 10/1977 | Larson | |
| 4,104,262 A | 8/1978 | Schade | |
| 4,262,072 A | 4/1981 | Wendling et al. | |
| 4,304,901 A | 12/1981 | O'Neill et al. | |
| 4,330,588 A | 5/1982 | Larson et al. | |
| 5,427,835 A | 6/1995 | Morrison et al. | |
| 6,132,861 A | 10/2000 | Kang et al. | |
| 6,238,798 B1 | 5/2001 | Kang et al. | |
| 6,245,833 B1 | 6/2001 | Kang et al. | |
| 6,299,799 B1 | 10/2001 | Craig et al. | |
| 6,340,404 B1 | 1/2002 | Oka et al. | |
| 6,376,590 B2 | 4/2002 | Kolb et al. | |
| 7,170,684 B2 | 1/2007 | Fukuda et al. | |
| 7,241,437 B2 | 7/2007 | Davidson et al. | |
| 7,323,514 B2 | 1/2008 | Jing et al. | |
| 7,332,213 B2 | 2/2008 | Mimura et al. | |
| 2005/0244623 A1 | 11/2005 | Nishida | |
| 2007/0286992 A1 | 12/2007 | Coggio et al. | |
| 2007/0286993 A1 | 12/2007 | Radcliffe et al. | |
| 2007/0286994 A1 | 12/2007 | Walker et al. | |
| 2010/0238557 A1* | 9/2010 | Tomoda .................... 359/586 |

OTHER PUBLICATIONS

Optical Thin Films User Handbook, 1996, pp. 36-37 and 82-83, Rancourt, James D.
Invitation to Pay Additional Fees and Communication Relating to the Results of the Partial International Search dated Jan. 12, 2010.
Macleod, H Angus, Thin-Film Optical Filters, Third Edition (New York:Taylor and Francis) © 2001 by H. Macloed, p. 49.
U.S. Appl. No. 11/744,318, filed May 4, 2007.
U.S. Appl. No. 12/165,765, filed Jul. 1, 2008.

* cited by examiner

*Primary Examiner* — Alessandro Amari
(74) *Attorney, Agent, or Firm* — Carolyn A. Fischer

(57) ABSTRACT

A method of reducing optical fringing of a coated substrate is described. The method comprises providing a (e.g. light transmissive) substrate; providing a primer having an unmatched refractive index, and applying the primer to the substrate forming a primer layer having an optically significant thickness. The primer layer in combination with the substrate has a percent reflectance at a maximum at a wavelength of interest. Also described are articles comprising a substrate, a primer having an unmatched refractive index, a high refractive index layer, and optional low refractive index layer such as an antireflective film article.

22 Claims, 3 Drawing Sheets

SUBSTRATE COMPRISING UNMATCHED REFRACTIVE INDEX PRIMER AT OPTICALLY SIGNIFICANT THICKNESS

BACKGROUND

Optical films having a high refractive index layer have been described. Such optical films can be used as an intermediate construction in an antireflective ("AR") film. AR films are often constructed of alternating high and low refractive index ("RI") layers of the correct optical thickness. With regards to visible light, one example is a thickness on the order of one-quarter of the wavelength of the light to be reflected. The human eye is most sensitive to light around 550 nm. Therefore, it is desirable to design the low and high index coating thicknesses in a manner that minimizes the amount of reflected light (e.g. 2.5% or lower) at around 550 nm.

As described for example in U.S. Patent Publication US2007/0286994, in order to reduce or eliminate optical fringing, it is preferred that the antireflective film substrate has a refractive index close to that of the high refractive index layer, i.e. differs from the high refractive index layer by less than 0.05, and more preferably less than 0.02. Further, a primer can be provided on the film substrate, the primer being chosen to closely match the refractive index of the high refractive index layer and the substrate.

Primers have also been employed to improve adhesion. When a primer is applied at a low coating thickness, of for example 30 nm, the primer does not substantially affect the optical fringing or the antireflective properties.

SUMMARY

In one embodiment, a method of reducing optical fringing of a coated substrate such as an optical (e.g. film) article is described. The method comprises providing a (e.g. light transmissive) substrate; providing a primer having an "unmatched" refractive index, (e.g. having a refractive index that differs from the substrate by at least 0.05); and applying the primer to the substrate forming a primer layer having an optically significant thickness of at least x/4 wave divided by the refractive index of the primer, wherein x is an integer of at least 2, and such that the primer layer in combination with the substrate has a percent reflectance at a maximum at a wavelength ranging from 500 nm to 600 nm.

In some embodiments, the method comprises coating the primer on the substrate at increasing thicknesses, measuring the percent reflectance of the primer coated substrate with a spectrophotometer, and selecting the primer thickness wherein the percent reflectance maximum is closest to 550 nm.

The method described herein is amenable to the use of relatively thick primer layers. Thick primer layers can provide improved interlayer adhesion in comparison to optically insignificant primer thicknesses. The use of an optically designed primer thickness, as described herein, is also amenable to the use of conventional polymeric primer compositions that are not necessarily index matched.

In some preferred embodiments, the method further comprises disposing a high refractive index layer, having a refractive index of at least 1.60, on the primer layer. In this embodiment, the primer also typically has an "unmatched" refractive index relative to the high refractive index layer (e.g. a refractive index that differs from the high refractive index layer by at least 0.05).

In other embodiments, articles are described comprising a substrate; a primer layer disposed on the substrate; and a high refractive index layer disposed on the primer layer. The primer layer has an unmatched refractive index relative to the substrate and the high refractive index layer. Further, the primer layer has a thickness of at least ¼ wave and such that the primer layer in combination with the substrate has a percent reflectance at a maximum at a wavelength +/−10% of the median of a wavelength range of light with which the article is illuminated during use. When the article is illuminated by visible light the wavelength range is 500 nm to 600 nm with a median wavelength of 550 nm.

DETAILED DESCRIPTION OF PREFERRED EMBODIMENTS OF THE INVENTION

Presently described are methods of reducing optical fringing and (e.g. optical film) articles comprising primer coated substrates.

Figure 1:
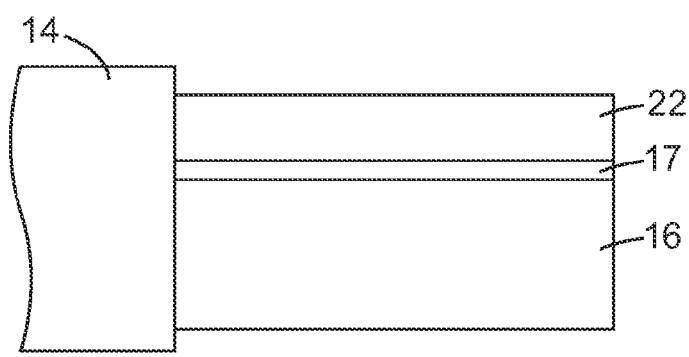
FIG. 1 is a sectional view of an embodied (e.g. optical film) article having a (e.g. light transmissive) substrate, a primer layer, and a high refractive index layer.

With reference to FIG. 1, an embodied (e.g. optical) article comprises a (e.g. light transmissive) substrate 16, primer layer 17 disposed on the substrate, and a high refractive index (e.g. hardcoat) layer 22 disposed on the primer layer. For embodiments wherein the optical film is an antireflective film, a low refractive index (e.g. surface) layer disposed on the high refractive index layer.

The primer, high refractive index layer, and optional low refractive index layer can be applied to a variety of substrates such as polymeric films. In some embodiments, such as when the substrate is a polymeric film suitable for commercial graphics, the substrate may be opaque, with insubstantial amounts of light being transmitted through the substrate. In preferred embodiments, the substrate is sufficiently light transmissive such that the primer coated substrate can be utilized on the surface of an optical article such as a display. In this embodiment, the light transmissive substrates, optical articles, and antireflective films described herein typically have a transmission of at least 80%, at least 85%, and preferably at least 90%. The method and articles described herein typically employ a (e.g. light transmissive) substrate having a gloss surface, i.e. having a gloss of at least 130 as measured according to ASTM D 2457-03 at 60°.

Figure 2:
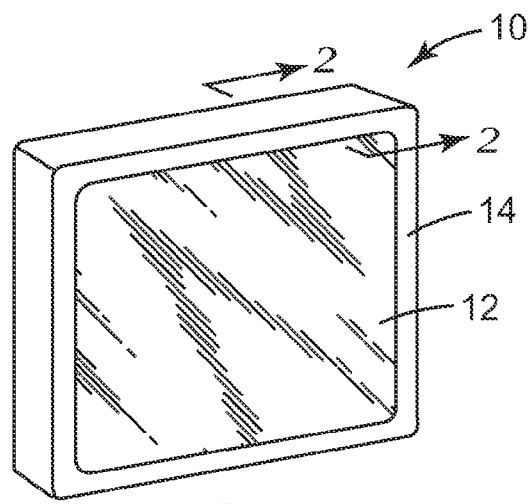
FIG. 2 is perspective view of an article having an optical display.

FIG. 2 is a perspective view of an article (here a computer monitor 10) having an optical display 12 assembled within a housing 14. The optical display comprises a light transmissive substrate 12 through which a user can view (e.g. illuminated) text, graphics, or other displayed information.

Figure 3:
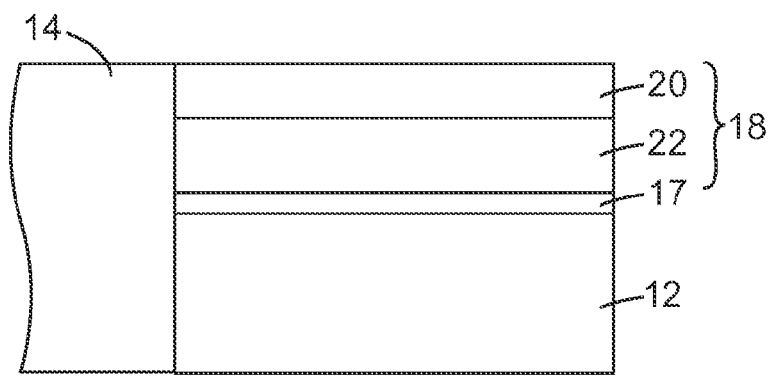
FIG. 3 is a sectional view of the article of FIG. 1 taken along line 2-2 illustrating an embodied antireflective film.

With reference to FIG. 3, the optical display 12 may include an antireflective ("AR" film comprising primer 17 disposed on a light transmissive substrate 12, a high refractive index layer 22 disposed on the primer, and a low refractive index layer 20 disposed on the high refractive index layer. Low refractive index layer 20 is typically a surface layer, exposed to the environment, as depicted in FIG. 2.

The combination of high and low refractive index layer forms an antireflective film 18. The high refractive index layer 22 has a refractive index of at least about 1.60, 1.61, 1.62, 1.63, 1.64, 1.65, 1.66, 1.67, 1.68, 1.69, or 1.70. The maximum refractive index of the high index layer is typically no greater than about 1.75 for coatings having high refractive index inorganic nanoparticles dispersed in a crosslinked organic material. The low refractive index layer 20 has a refractive index less than a high refractive index layer. The difference in refractive index between the high refractive index layer and low refractive index layer is typically at least 0.10, or 0.15, or 0.2 or greater. The low refractive index layer typically has a refractive index of less than about 1.5, more typically of less than about 1.45, and even more typically less than about 1.42. The minimum refractive index of the low index layer is generally at least about 1.35. Ideally, the refractive index of the low refractive index layer is about equal to the square root of the refractive index of the high refractive index layer.

Antireflective films preferably have an average reflectance of less than 3%, 2%, or 1% from wavelengths of 450 nm to 650 nm as measured with a spectrophotometer as described in the examples. Optical articles comprising a light transmissive film, primer layer, and high refractive index layer (i.e. in the absence of a low refractive index layer) as depicted in FIG. 1 typically have a higher average reflectance of for example 4% to 10%.

For many applications, the (e.g. light transmissive) substrate thickness is preferably less than about 0.5 mm, and more preferably about 0.02 to about 0.2 mm. The display substrate 12 may comprise or consist of any of a wide variety of non-polymeric materials, such as glass. The optical article substrate 12 or (e.g. light transmissive) film 16 typically comprises various thermoplastic and crosslinked polymeric materials. Preferred film materials include polyethylene terephthalate (PET), polyethylene naphthalate (PEN), (e.g. bisphenol A) polycarbonate, cellulose(tri)acetate, poly(methyl methacrylate), polyolefins such as biaxially oriented polypropylene, and combinations thereof. In addition, the substrate may comprise a hybrid material, having both organic and inorganic components. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation.

Various light transmissive optical films can be utilized in the method and articles described herein including but not limited to, multilayer optical films, microstructured films such as retroreflective sheeting and brightness enhancing films, (e.g. reflective or absorbing) polarizing films, diffusive films, as well as (e.g. biaxial) retarder films and compensator films.

The (e.g. antireflective) optical film may comprise other layers. A permanent or removable grade adhesive composition may be provided on the opposite side of the substrate. The pressure sensitive adhesive layer is typically in contact with a removable release liner. During application of an optical film to a display surface, the release liner is removed so the optical film article can be adhered to the display surface.

Presently described is a method of reducing the interference fringing of an (e.g. optical) article. The method generally comprises providing a primer layer on a (e.g. light transmissive) substrate at an optically significant thickness (i.e. at least ¼ wave) and at a thickness wherein the percent reflectance of the primer layer in combination with the (e.g. light transmissive) substrate is at a maximum at a wavelength within a wavelength range of interest. The wavelength of interest is the wavelength range with which the optical article is illuminated during normal usage. For optical articles that are passively illuminated by visible light, the wavelength range of interest is from 500 nm to 600 nm, with 550 nm being the median wavelength and typically primary wavelength of interest. However, for other optical articles, the wavelength range of interest may be a different wavelength range than visible light. For example, when the coated light transmissive film is employed as an antireflective film on a lens for use in an infrared camera, the wavelength range of interest is 600 nm to 1200 nm with a median wavelength of 900 nm.

In some embodiments, the method comprises coating the primer on the substrate at increasing thicknesses, measuring the percent reflectance of the primer coated substrate with a spectrophotometer, and selecting the primer thickness wherein the percent reflectance maximum is closest to 550 nm. The steps of coating the primer and measuring the reflectance can be conducted on-line during the manufacture of an article or intermediate thereof. Alternatively, these steps can be conducted separately prior to manufacture.

The primer layers described herein have an "unmatched refractive index". The primer layer has a refractive index that differs from the (e.g. light transmissive) layer by at least 0.05. The primer layer also has a refractive index that differs from the high refractive index layer by at least 0.05. Hence, the primer layer generally has an unmatched refractive index relative to each adjacent layer.

The number of layers of an assembly of thin films can be determined by cross-sectional microscopy. Further, the refractive index of each layer can be determined by ellipsometry. In some embodiments, the thickness of the layers can also be determined by cross-sectional microscopy. However, typically the thickness of the layers is calculated according to Macleod, H Angus 2001 *Thin-Film Optical Filters* Third edn (New York: Taylor and Francis), p. 49, ("Macleod").

The spectral reflection from a stack of optical layers is a result of interference of light reflected from each interface in the stack. Incident light travels from the higher index layer to the lower index layer at the interface between the high index layer and primer layer. At the next interface, i.e. from the primer layer to the (e.g. light transmissive) substrate, the incident light travels from a lower index layer to a higher index layer or vice versa depending on the substrate. Without intending to be bound be theory, it is surmised that when the magnitude of the reflected component from the high index layer/primer layer interface is the same as the reflected component from the primer layer/substrate interface, and these two reflected components are a half-wave multiple shifted from each other (i.e. "out of phase"), these reflected components cancel each other resulting in a reduction in interference fringing.

When the reflected components are a full-wave multiple shifted from each other (i.e. "in phase"), the reflected components add. The amplitude of the interference fringing is unaffected by the presence of the primer layer because the amplitude from each reflected component is half that of the amplitude that would have been reflected without the intermediate index primer layer.

This interference behavior can be expressed according to the equation $$\text{primer thickness} = \frac{x/4(\text{wavelength of interest})}{\text{refractive index of the primer}} \quad \text{(Equation 1)}$$

wherein x is an integer of the number of quarter waves the two reflective components are shifted from each other. The integer x is also the thickness of the primer in units of quarter waves at the wavelength of interest (i.e. accounting for the reflected light from the substrate interface twice).

In some embodiments, the primer layer has a refractive index less than the (e.g. light transmissive) substrate and less than the high refractive index layer. In other embodiments, the primer layer has a refractive index between the (e.g. light transmissive) substrate and the high refractive layer.

For embodiments wherein the (e.g. light transmissive) substrate has a refractive index greater than the primer, there is a half-wave phase change upon reflection. Primer thicknesses that add a full wave of phase shift result in an odd number of half-waves of total phase shift relative to the reflected component of light contributed by the primer/high refractive index layer interface. Thus, in these embodiments, x is preferably an even integer.

For embodiments wherein the (e.g. light transmissive) substrate has a refractive index less than the primer there is no longer a phase shift upon reflection. The phase shift relative to the other reflected component is dependent upon the thickness of the primer. Thus, in this embodiment, x is preferably an odd integer.

Figure 4:
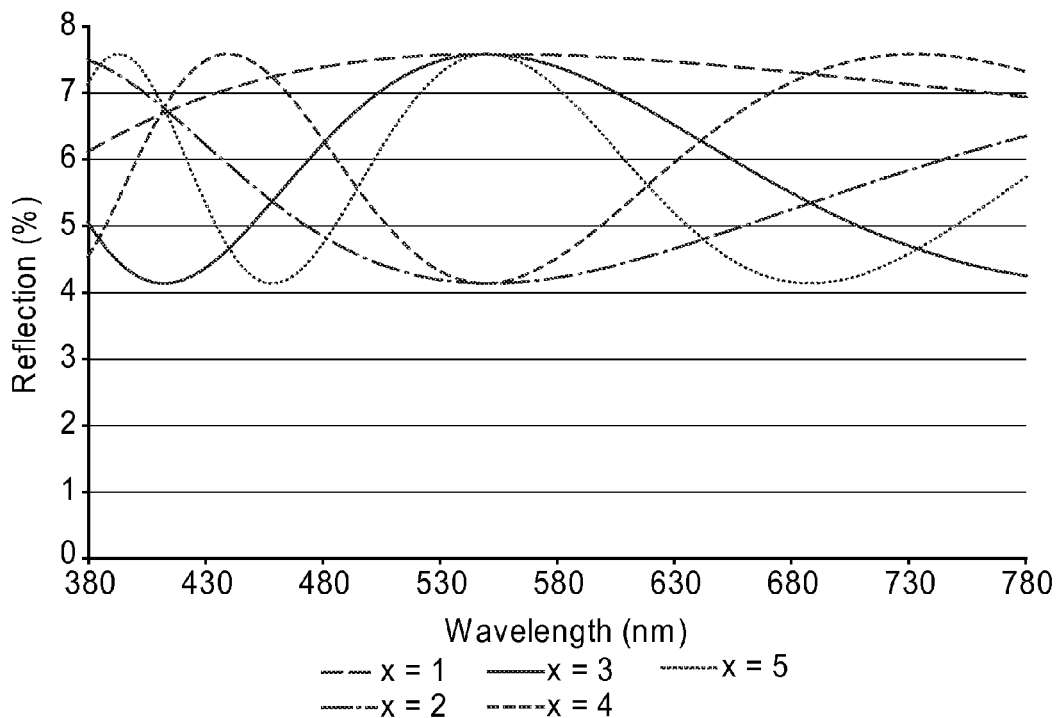
FIG. 4 exhibits modeled specular reflection of various primer thicknesses on a light transmissive substrate.

This behavior is illustrated in the graphs of FIGS. 4-7. FIG. 4 depicts the modeled specular reflection of an assembly of thin films, as calculated according to Macleod. The odd x's, wherein x is 1, 3 or 5, exhibit a maximum at 550 nm (the wavelength of interest), whereas the evens x's exhibit a minimum.

Figure 5:
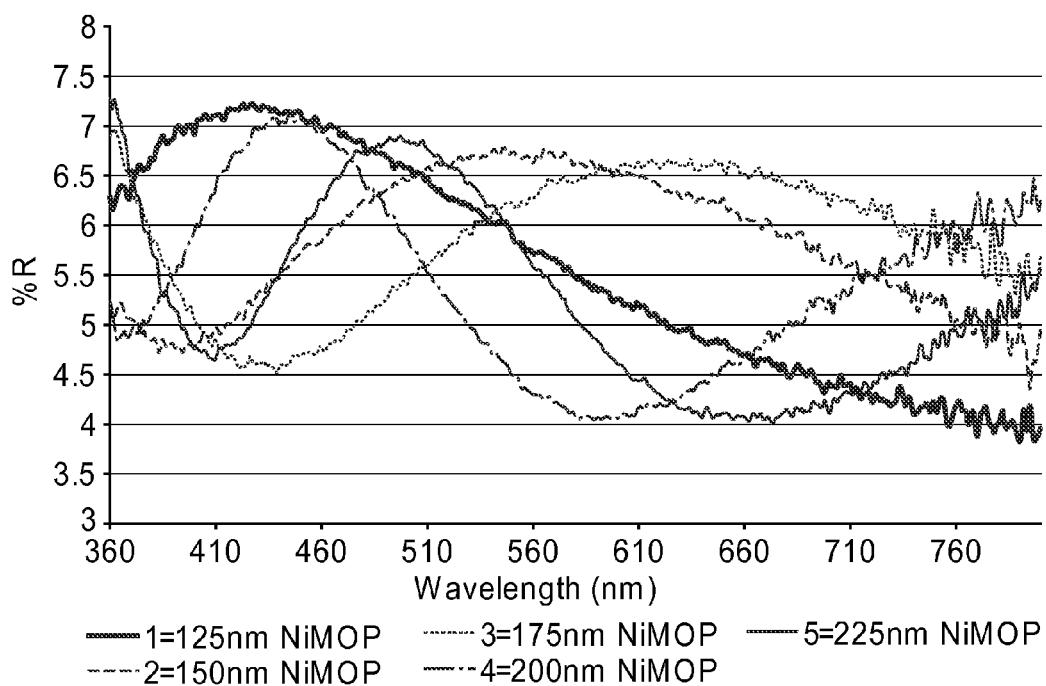
FIG. 5 depicts the total reflection versus wavelength spectrum of a light transmissive substrate comprising a primer disposed at different thicknesses increasing from 1 to 5.

FIG. 5 is a graph of the total reflection of a (e.g. light transmissive polyester film) substrate having different thicknesses of primer, the thickness of the primer increasing from 1-5. These reflection spectras are similar to FIG. 4 with the exception that in FIG. 5 the irregularity of the curves depicts the optical interference fringing. FIGS. 4 and 5 illustrate that changing the thickness of the primer causes a shift in the location of the % reflectance maximum to either the right or left.

Figure 6:
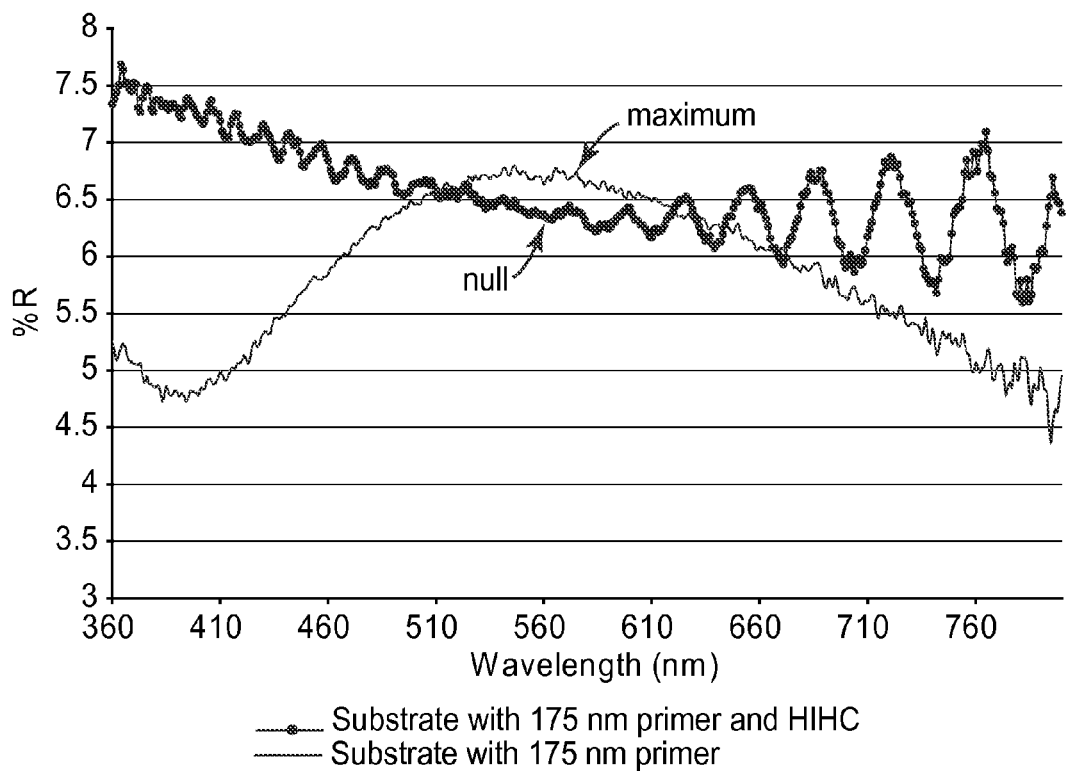
FIG. 6 demonstrates the correspondence between the maximum reflectance of the primer coated (e.g. light transmissive) substrate and the null in the interference fringing of the primer substrate having a high index hardcoat (HIHC) layer applied to the primer.

As best illustrated in FIG. 6, it has been found that a maximum in the % reflectance of the primer coated substrate results in a null in the interference fringing. The amplitude of the fringing correlates to the refractive index mismatch between the primer and the high refractive index layer. The null compresses the amplitude.

Figure 7:
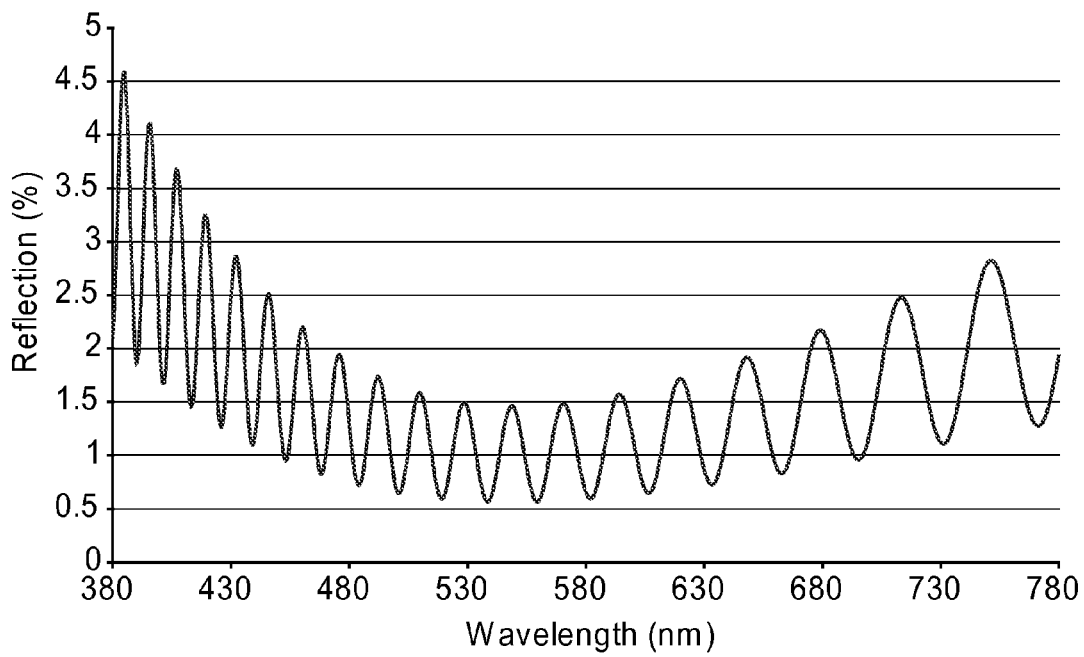
FIG. 7 exhibits modeled specular reflection of an antireflective film.

FIG. 7 depicts the modeled specular reflection of an antireflective film, as calculated according to Macleod using the following parameters:

| | Refractive Index | Thickness |
|---|---|---|
| Low Index Surface Layer | 1.43 | 97 nm |
| High Index Hardcoat | 1.68 | 4000 nm |

-continued

| | Refractive Index | Thickness |
|---|---|---|
| Sulfonated Polyester Primer | 1.63 | 85 nm (¼ wave) |
| Triacetate Cellulose Substrate | 1.51 | infinite |

Although there is not a complete null of the fringing at the target wavelength (ie. 550 nm), the amplitude of the interference fringing is reduced, yet is still of the magnitude of about 1%. In preferred embodiments, the amplitude of the fringing is less than ½% and more preferably approaches zero.

Based on Equation 1 as previously described, one approach to further reduce the fringing would be to adjust the refractive index of the primer lower to 1.59 (e.g. by the addition of silica), in order that the refractive index of the primer is equal to (the refractive index of high refractive index layer+the refractive index of substrate)/2.

Although a ¼ wave thickness (i.e. when x is 1) is optically significant, such primer thickness is typically insufficient for improving interlayer adhesion interlayer. Hence, x is at preferably at least 2, 3, 4 or 5. Accordingly, the thickness of the primer is preferably a multiple of ¼ wave, i.e. ½, ¾, 1, 1¼, etc.

Various primer compositions, as known in the art, can be applied to a (e.g. light transmissive) substrate at an optically significant thickness as described herein.

The primer composition comprises a base polymer. The base polymer may be a single polymer or a blend of polymers. The blend of polymers may form a homogeneous mixture or may be multiphase, exhibiting two or more distinct peaks when analyzed via differential scanning calorimetry (DSC). Further, the primer composition may comprise an interpenetrating network of the base polymer in an insoluble matrix or vice-versa. The primer compositions for use in the invention include solvent-based primer compositions, water-based primer compositions.

The base polymer of the primer compositions typically comprises one or more film-forming resins. Upon evaporation of the solvent, the primer composition typically forms a continuous film.

Various film-forming resins are known. Representative film-forming resins include acrylic resin(s), polyvinyl resin(s), polyester(s), polyacrylate(s), polyurethane(s) and mixtures thereof.

The selection of the base polymer depends primarily on the composition of the (e.g. light transmissive) substrate being coating. In general, polyester resins are typically preferred for coating polyester (PET) and polyethylene naphthalate (PEN) substrate. Suitable commercially available polyester primers include for example copolyester resins commercially available from Bostik Inc., Middleton, Mass. under the trade designation "Vitel 1200B" and from Morton International, Chicago, Ill. under the trade designations "Adcote69X100" and "Adcote 61WG178".

Acrylic resins are typically preferred for polyolefin and poly(methyl methacrylate) substrates. Various acrylic resins as the base polymer of the primer are also know. In general, acrylic resins are prepared from various (meth)acrylate monomers such as methyl methacrylate (MMA), ethyl acrylate (EA), butyl acrylate (BA), butyl methacrylate (BMA), n-butyl methacrylate (n-BMA) isobutylmethacrylate (IBMA), etc. alone or in combination with each other. Exemplary acrylic resins include those commercially available from Incos Acrylics, Cordova, Tenn. under the trade designation "Elvacite" resins. Preferred primers for cellulose(tri)
acetate substrates include polyvinyl alcohol and polyester
resins.

A wide variety of sulfopolymers can be used in the primer
compositions including sulfopolyesters, ethylenically-unsaturated sulfopolymers, sulfopolyurethanes, sulfopolyurethane/polyureas, sulfopolyester polyols, and sulfopolyols.
Such sulfopolymers are described in U.S. Pat. No. 5,427,835;
incorporated herein by reference.

Also useful are commercially available sulfonate-containing polymers such as poly(sodium styrene sulfonate) available from Polyscience, Inc., Warrington, Pa., and alkylene
oxide-co-sulfonate-containing polyester (AQ™ resins, Eastman Chemical, Kingsport, Tenn.).

The sulfopolymers are generally water dispersible and thus
can be used as the polymeric binder of a water-based coating
composition.

In one aspect, the sulfopolymer is a non-crystalline sulfopolyester having a low melting point (below 100° C.). Such
sulfopolyesters are described in U.S. Pat. Nos. 3,734,874;
3,779,993; 4,052,368; 4,104,262; 4,304,901; and 4,330,588.

In general, sulfopolyesters of this type may be described by
the following formula:

having a formula H—$(OR^5)_d$—OH in which $R^5$ is an alkylene
group having 2 to 4 carbon atoms and d is an integer of 1 to 6,
the values being such that there are no more than 10 carbon
atoms in the oxaalkylenediol. Examples of suitable diols
include ethyleneglycol, propyleneglycol, 1,5-pentanediol,
1,6-hexanediol, 1,8-octanediol, 1,10-decanediol, 2,2-dimethyl-1,3-propanediol, 2,2-diethyl-1,3-propanediol, 3-methyl-1,5-pentanediol, diethyleneglycol, dipropyleneglycol,
diisopropyleneglycol, and the like. Also included are suitable
cycloaliphatic diols such as 1,4-cyclohexanedimethanol, 1,3-cyclohexanedimethanol, and the like. Suitable polyester or
polyether polyols may used such as polycaprolactone, polyneopentyl adipate, or polyethyleneoxide diols up to 4000 in
molecular weight, and the like; generally these polyols are
used in conjunction with lower molecular weight diols such
as ethylene glycol if high molecular weight polyesters are
desired.

$R^6$ can be incorporated in the sulfopolyester by the selection of suitable aliphatic or cycloaliphatic dicarboxylic acids
or corresponding acid chlorides, anhydrides or ester derivatives; such as acids having the formula $HOOC(CH_2)_e COOH$,
wherein e is an integer having an average value of 2 to 8 (e.g.
succinic acid, adipic acid, maleic acid, glutaric acid, suberic

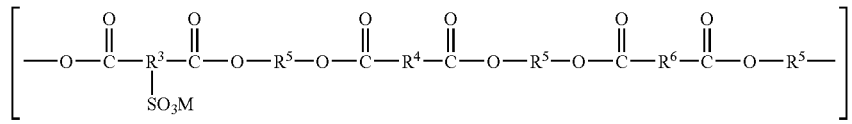

where

M can be an alkali metal cation such as sodium, potassium,
or lithium; or suitable tertiary and quaternary ammonium
cations having 0 to 18 carbon atoms, such as ammonium,
hydrazonium, N-methylpyridinium, methylammonium,
butylammonium, diethylammonium, triethylammonium, tetraethylammonium, and benzyltrimethylammonium.

$R^3$ can be an arylene or aliphatic group incorporated in the
sulfopolyester by selection of suitable sulfo-substituted
dicarboxylic acids such as sulfoalkanedicarboxylic acids
including sulfosuccinic acid, 2-sulfoglutaric acid, 3-sulfoglutaric acid, and 2-sulfododecanedioic acid; and sulfoarenedicarboxylic acids such as 5'-sulfoisophthalic acid, 2-sulfoterephthalic acid, 5-sulfonapthalene-1,4-dicarboxylic acid;
sulfobenzylmalonic acid esters such as those described in
U.S. Pat. No. 3,821,281; sulfophenoxymalonate such as
described in U.S. Pat. No. 3,624,034; and sulfofluorenedicarboxylic acids such as 9,9-di-(2'-carboxyethyl)-fluorene-2-sulfonic acid. Corresponding lower alkyl carboxylic esters of
4 to 12 carbon atoms, halides, anhydrides, and sulfo salts of
the above sulfonic acids can also be used.

$R^4$ can be optionally incorporated in the sulfopolyester by
the selection of one or more suitable arylenedicarboxylic
acids, or corresponding acid chlorides, anhydrides, or lower
alkyl carboxylic esters of 4 to 12 carbon atoms. Suitable acids
include the phthalic acids (orthophthalic, terephthalic, isophthalic), 5-t-butylisophthalic acid, naphthalic acids (e.g., 1,4-
or 2,5-napthalene dicarboxylic), diphenic acid, oxydibenzoic
acid, anthracene dicarboxylic acids, and the like. Examples of
suitable esters or anhydrides include dimethyl isophthalate or
dibutyl terephthalate, and phthalic anhydride.

$R^5$ can be incorporated in the sulfopolyester by the selection of one or more suitable diols including straight or
branched chain alkylenediols having the formula $HO(CH_2)_c$
OH in which c is an integer of 2 to 12 and oxaalkylenediols acid, sebacic acid, and the like). Suitable cycloaliphatic acids
include cyclohexane-1,4-dicarboxylic acid, and the like.

The base polymer of the primer may be mixed with a
crosslinker. Suitable crosslinkers for (e.g. sulfopolyester) sulfopolymers include carbodiimide crosslinkers, organosilane
crosslinkers, epoxy crosslinkers, aziridine crosslinkers, and
blends thereof. The concentration of crosslinker is typically at
least about 1 wt-%, 2 wt-% or 3 wt-% based on polymer
solids. The concentration of crosslinker is generally less than
20 wt-%, and in some embodiments no greater than about 15
wt-% based on polymer solids. An illustrative carbodiimide
crosslinker is available from Stahl Chemicals under the trade
designation "XR-5577". An illustrative polyfunctional aziridine crosslinker is commercially available from DSM NeoResins under the trade designation "Crosslinker CX-100".
Another illustrative polyfunctional aziridine crosslinker is
commercially available from Hoechst Celanese under the
trade designation "XAMA-7". An illustrative organosilane
crosslinker is γ-glycidoxypropyltrimethoxysilane, commercially available from Aldrich.

Aziridine cross-linkers such as Crosslinker CX-100 and
XAMA-7 can improve adhesion with the high refractive
index (e.g. hardcoat) layer. Carbodiimide crosslinkers not
only improve adhesion with high refractive index layer, but
also provide more stable coating formulations and better
compatibility with conductive polymer antistatic additives
such as Baytron P than that of aziridine crosslinkers. Epoxyorganosilane crosslinkers are particularly suitable for cellulose(tri)acetate film material.

The kind (e.g. molecular weight) and amount of polymer(s) selected for use as the base polymer of the primer
composition are chosen such that the primer composition
exhibits a suitable viscosity for use in the intended application
equipment. For example, if the primer is intended to be gravure coated, the kind and amount of base polymer(s) is chosen such that the primer composition will have a viscosity ranging from about 20 to about 1000 cps. In the case of knife coating and bar coating, however, the viscosity may range as high as 20,000 cps. For such embodiments, the primer may comprise a higher molecular weight base polymer and/or higher concentration of base polymer.

The primer coating formulation may be water- or solvent-based, although water-based is typically preferred. In general, the primer layer may be formed by applying directly or transfer coating the primer coating formulation onto the (e.g. light transmissive) substrate.

Solvent-based primer compositions comprise the base polymer admixed with a solvent. The solvent may be a single solvent or a blend of solvents, as previously described with regard to the ink composition. The solvent-based primer composition preferably contains about 5 to about 60 parts by weight of the base polymer, more preferably about 10 to about 40 parts base polymer and most preferably about 10 to about 30 parts base polymer, with the remainder of the primer composition being solvent and optional additives.

The refractive index of the primer is typically about 1.5~1.6. In some embodiments, the primer is a polymeric material substantially free of inorganic nanoparticles. However, to adjust the refractive index of the primer, nanoparticles having a different refractive index than the base polymer of the primer can be added. For example, to raise the refractive index of the primer, nanoparticles having a higher refractive index (e.g. zirconia) than the base polymer can be added to the base polymer of the primer. Conversely, to lower the refractive index of the primer, (e.g. silica) nanoparticles having a lower refractive index than the base polymer of the primer can be added.

The primer composition may optionally contain one or more antistatic agents in an amount sufficient to provide that static dissipative properties as described in U.S. patent application Ser. No. 11/744,318. For nanoparticle antistats, the antistatic agent is present in an amount of at least 20 wt-%. For conducting inorganic oxide nanoparticles, levels can be up to 80 wt % solids for refractive index modification. When a conductive polymer antistat is employed, it is generally preferred to employ as little as possible due to the strong absorption of the conductive polymer in the visible region. Accordingly, the concentration is generally no greater than 20 wt-% solid, and preferably less than 15 wt-%. In some embodiments the amount of conductive polymer ranges from 2 wt-% to 5 wt-% solids of the dried antistatic layer.

In some embodiments, the primer composition can comprises at least one conductive polymer as an antistatic agent. Various conductive polymers are known. Examples of useful conductive polymers include polyaniline and derivatives thereof, polypyrrole, and polythiophene and its derivatives. One particularly suitable polymer is poly(ethylenedioxythiophene) (PEDOT) such as poly(ethylenedioxythiophene) doped with poly(styrenesulfonic acid) (PEDOT:PSS) commercially available from H. C. Starck, Newton, Mass. under the trade designation "BAYTRON P". This conductive polymeric can be added at low concentrations to sulfopolyester dispersions to provide antistatic compositions that provided good antistatic performance in combination with good adhesion particularly to polyester and cellulose acetate substrates.

In other embodiments, the primer composition can comprise conductive metal-containing particles, such as metals or semiconductive metal oxides. Such particles may also be described as nanoparticles having a particle size or associated particle size of greater than 1 nm and less than 200 nm. Various granular, nominally spherical, fine particles of crystalline semiconductive metal oxides are known. Such conductive particles are generally binary metal oxides doped with appropriate donor heteroatoms or containing oxygen deficiencies.

Various antistatic particles are commercially available as water-based and solvent-based dispersions. Antimony tin oxide (ATO) nanoparticle dispersions that can be used include a dispersion available from Air Products under the trade designation "NanoATO S44A" (25 wt-% solids, water), 30 nm and 100 nm (20 wt-% solids, water) dispersions available from Advanced Nano Products Co. Ltd. (ANP), 30 nm and 100 nm ATO IPA sols (30 wt-%) also available from ANP, a dispersion available from Keeling & Walker Ltd under the trade designation "CPM10C" (19.1 wt-% solids), and a dispersion commercially available from Ishihara Sangyo Kaisha, Ltd under the trade designation "SN-100 D" (20 wt-% solids). Further, an antimony zinc oxide (AZO) IPA sol (20 nm, 20.8 wt-% solids) is available from Nissan Chemical America, Houston Tex. under the trade designations "CELNAX CX-Z210IP", "CELNAX CX-Z300H" (in water), "CELNAX CX-Z401M" (in methanol), and "CELNAX CX-Z653M-F" (in methanol).

Additives such as rheology modifier(s), flow agent(s), leveling agent(s), anti-foamer(s), anti-skinning agent(s), surfactants and various preservatives such as biocides are also typically included in the aqueous primer compositions at small concentrations.

In some embodiments, a high refractive index layer is disposed on the primer layer.

The high refractive index layer may consist of a (e.g. single) thin layer of an inorganic material such as a metal or metal oxide. Such high refractive index layers can be deposited by thermal evaporation, sputtering, or vacuum deposition techniques.

The high refractive index layer preferably comprises surface modified nanoparticles having a high refractive index dispersed in a crosslinked organic material. A variety of (e.g. non-fluorinated) free-radically polymerizable monomers, oligomers, polymers, and mixtures thereof can be employed in the organic material of the high refractive index layer. Preferably the organic material of the high refractive index layer comprises a non-fluorinated free-radically polymerizable material having three or more (meth)acrylate groups alone or in combination with non-fluorinated monofunctional and/or difunctional materials.

Various high refractive index particles are known including for example zirconia ("$ZrO_2$"), titania ("$TiO_2$"), antimony oxides, alumina, tin oxides, alone or in combination. Mixed metal oxide may also be employed. The refractive index of the high refractive index particles is at least 1.60, 1.65, 1.70, 1.75, 1.80, 1.85, 1.90, 1.95, or 2.00.

Zirconias are available from Nalco Chemical Co. under the trade designation "Nalco OOSSOO8" and from Buhler AG Uzwil, Switzerland under the trade designation "Buhler zirconia Z-WO sol" and Nissan Chemical America Corporation under the trade name NanoUse ZR™. Zirconia nanoparticles can also be prepared such as described in U.S. Pat. Nos. 7,241,437 and 6,376,590. A nanoparticle dispersion that comprises a mixture of tin oxide and zirconia covered by antimony oxide (RI~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S401M".

The concentration of inorganic nanoparticles in the crosslinked high refractive index hardcoat can be at least 60, 65, 70, 75, 80 wt-% solids of the cured high refractive index hardcoat. Hence, the concentration of free-radically polymerizable organic components (i.e. including the nanoparticle surface treatments) is typically at least 20 wt-% and no greater than 40 wt-% solids. In preferred embodiments, the concentration of inorganic nanoparticles in the crosslinked high refractive index hardcoat ranges from 60 to 70 wt-%.

Even though the hardcoat composition comprises a relatively high concentration of inorganic nanoparticles, in preferred embodiments the cured hardcoat layer is flexible such as described in U.S. patent application Ser. No. 12/165,765; incorporated herein by reference. In some embodiments, the high refractive index layer is sufficiently "flexible" such that a 3 to 5 micron cured layer of the high refractive index hardcoat does not crack when tested according to ISO 1519 using a mandrel size of 6 mm.

In some embodiments, the coated substrate is an antireflective film further comprising a low refractive index surface layer disposed on the high refractive index layer.

Durable antireflective films generally comprise a relatively thick high refractive index hardcoat layer in combination with a relatively thin low refractive index layer. The high refractive index layer typically has a thickness of at least 0.5 microns, preferably at least 1 micron, more preferably at least 2 microns. The high refractive index layer typically has a thickness of no greater than 10 microns and more typically no greater than 5 microns. The low refractive index layer has an optical thickness of about ¼ wave. Such thickness is typically less than 0.5 microns, more typically less than about 0.2 microns and often about 90 nm to 110 nm. When a durable high refractive index layer is employed in combination with a durable low refractive index layer, a durable (e.g. two-layer) antireflective film can be provided in the absence of additional hardcoat layers.

In yet another embodiment, both the low refractive index layer and high refractive index hardcoat layer described herein may be relatively thin, each layer being at least about 50 nm and less than 0.5 microns (e.g. less than 0.2 microns). For this embodiment, the durable antireflective film article comprises an additional hardcoat layer between the substrate and the high index layer, such as described in U.S. Pat. No. 7,323,514. The additional hardcoat layer contains (e.g. surface modified silica) nanoparticles dispersed in an organic matrix such as described in U.S. Pat. No. 6,132,861 (Kang et al. '861), U.S. Pat. No. 6,238,798 B1 (Kang et al. '798), U.S. Pat. No. 6,245,833 B1 (Kang et al. '833) and U.S. Pat. No. 6,299,799 (Craig et al. '799).

The low refractive index surface layer comprises the reaction product of a polymerizable low refractive index composition comprising at least one (e.g. fluorinated) low surface energy free-radically polymerizable material and surface modified inorganic nanoparticles having a low refractive index (e.g. less than 1.50).

Various low refractive index inorganic particles are known such as metal oxides, metal nitrides, and metal halides (e.g. fluorides). Preferred low refractive index particles include colloidal silica, magnesium fluoride, and lithium fluoride. Silicas for use in the low refractive index composition are commercially available from Nalco Chemical Co., Naperville, Ill. under the trade designation "Nalco Colloidal Silicas" such as products 1034a, 1040, 1042, 1050, 1060, 2327 and 2329. Suitable fumed silicas include for example, products commercially available from DeGussa AG, (Hanau, Germany) under the trade designation, "Aerosil series OX-50", as well as product numbers -130, -150, and -200. Fumed silicas are also commercially available from Cabot Corp., Tuscola, Ill., under the trade designations "CAB-O-SPERSE 2095", "CAB-O-SPERSE A105", and "CAB-O-SIL M5". The silica nanoparticles are preferably surface modified with an organosilane compound such as an aminosilane.

The concentration of (e.g. inorganic) nanoparticles in the low refractive index layer and/or the high refractive index layer is typically at least 5 vol-%, and preferably at least 15 vol-%. The concentration of inorganic particles is typically no greater than about 60 vol-%, and more preferably no greater than 50 vol-%.

The surface energy of the low index coating composition can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy can provide anti-soiling and stain repellent properties as well as rendering the exposed surface easy to clean.

In some aspects, the durable antireflective films resist scratching after repeated contact with an abrasive material such as steel wool. The presence of significant scratching can increase the haze of the antireflective film. The antireflective film preferably has a haze of less than 1.5% or 1.0% after 5, 10, 15, 20, or 25 wipes with steel wool using a 3.2 cm mandrel and a mass of 1000 g, according to the Steel Wool Durability Test as described in U.S. Patent Application US2007/0286994; incorporated herein by reference.

Surface layers that resist visible scratching do not necessarily retain their low surface energy. In preferred embodiments, the antireflective films also retain low surface energy after repeated contact with an abrasive material such as steel wool. In preferred embodiments, the antireflective film preferably exhibits an advancing contact angle with hexadecane of at least 45°, 50°, or 60° after 5, 10, 15, 20, or 25 wipes with steel wool using a 3.8 cm diameter mandrel and a mass of 1000 grams. The antireflective film typically also exhibits a static contact angle with water of at least 90°, 95°, or 100° after 10 wipes, 50 wipes, 100 wipes, 200 wipes, or even 300 wipes with steel wool using a 3.8 cm diameter mandrel and a mass of 500 grams.

The inorganic nanoparticles of the various layers are surface treated, as know in the art, such that the nanoparticles are well dispersed resulting in a substantially homogeneous composition. Organosilanes and carboxylic acids surface treatments are preferred for metal oxides such as zirconia. Organosilanes surface treatments are also preferred for silica. The surface modification can be done either subsequent to mixing with the monomers or after mixing.

The surface modified colloidal nanoparticles of the high and/or low refractive index layer can be substantially fully condensed. Non-silica-containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic nanoparticles preferably have a substantially monodisperse size distribution or a polymodal distribution obtained by blending two or more substantially monodisperse distributions. Alternatively, the inorganic nanoparticles can be introduced having a range of particle sizes obtained by grinding the particles to a desired size range. The inorganic oxide nanoparticles are typically non-aggregated (substantially discrete), as aggregation can result in optical scattering (haze) or precipitation of the inorganic oxide particles or gelation. The inorganic oxide nanoparticles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The low refractive index polymerizable composition and high refractive index polymerizable composition generally comprise at least one crosslinker having at least three free-radically polymerizable groups. This component is often a non-fluorinated multi-(meth)acrylate monomer. The inclusion of such material contributes to the hardness of the cured compositions.

The low refractive index and organic high refractive index polymerizable compositions typically comprise at least 5 wt-%, or 10 wt-%, or 15 wt-% of crosslinker. The concentration of crosslinker in the low refractive index composition is generally no greater than about 40 wt-%. For preferred embodiments that employ high concentration of inorganic particles, the concentration of crosslinker in the high refractive index composition is generally no greater than about 25 wt-%.

Suitable monomers include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl) isocyanurate triacrylate (from Sartomer under the trade designation "SR368"). In some aspects, a hydantoin moiety-containing multi-(meth)acrylate compound, such as described in U.S. Pat. No. 4,262,072 (Wendling et al.) is employed.

The low refractive index layer preferably comprises one or more free-radically polymerizable materials having a fluorine content of at least 25 wt-%. Highly fluorinated monomer, oligomers, and polymers are characterized by having a low refractive index. Various fluorinated multi- and mono-(meth) acrylate materials having a fluorine content of at least about 25 wt-% are known. In some embodiments, the low refractive index polymerizable composition has a fluorine content of at least 30 wt-%, at least 35 wt-%, at least 40 wt-%, at least 45 wt-%, or at least 50 wt-%. Typically, a major portion of the highly fluorinated material is a multifunctional free-radically polymerizable material. However, such materials can be used in combination with fluorinated mono-functional materials.

In some embodiments, the low refractive index polymerizable composition comprises at least one free-radically polymerizable fluoropolymer.

In one embodiment, fluoropolymers are formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2 = CF_2$ (1)

VDF: $CH_2 = CF_2$ (2)

HFP: $CF_2 = CF - CF_3$ (3)

Preferred fluoropolymers comprise at least two of the constituent monomers (HFP and VDF), and more preferably all three of the constituent monomers in varying molar amounts.

The fluoropolymer comprises free-radically polymerizable groups. This can be accomplished by the inclusion of halogen-containing cure site monomers ("CSM") and/or halogenated endgroups, which are interpolymerized into the polymer using numerous techniques known in the art. These halogen groups provide reactivity towards the other components of the coating mixture and facilitate the formation of the polymer network. Optionally, halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: $Br-CF_2CF_2-Br$, $CF_2Br_2$, $CF_2I_2$, $CH_2I_2$.

The fluoropolymer-containing low refractive index compositions described herein can comprise at least one amino organosilane ester coupling agent or a condensation product thereof as described in U.S. Pat. No. 7,323,514; incorporated herein by reference.

In some embodiments, the low refractive index polymerizable composition comprises at least one free-radically polymerizable fluoro(meth)acrylate polymer. Various fluorinated mono- and multi-functional (meth)acrylate polymerizable monomers, oligomers, and polymers may be employed in the preparation of the low refractive index layer and fluoro(meth) acrylate polymer. Such materials generally comprises free-radically polymerizable (meth)acrylate moieties in combination with (per)fluoropolyether moieties, (per)fluoroalkyl moieties, and (per)fluoroalkylene moieties. Within each of these classes are multi-functional species having a high fluorine content, (e.g. of at least 25 wt-%). Other species within each class, having fluorine content less than 25 wt-%, that can be employed as auxillary components. In some embodiments, such auxiliary fluorinated (meth)acrylate monomers can aid in compatibilizing the low refractive index or other fluorinated materials present in the reaction mixture. For example, the low refractive index layer may comprises the reaction product of a composition comprising at least one free-radically polymerizable material having a fluorine content of at least about 35 wt-%, and at least one fluoropolyether urethane material having a fluorine content ranging from about 10 wt-% to about 30 wt-% fluorine and a free-radically polymerizable end group, as described in Published U.S. Patent Application No. US2007/0286992.

In another embodiment, the low refractive index layer comprises the reaction product of a A) fluoro(meth)acrylate polymeric intermediate and B) at least one fluorinated (meth) acrylate monomer as described in Published U.S. Application No. US2007/0286993; incorporated herein by reference. The mixture of A) and B) is preferably cured by exposure to (e.g. ultraviolet light) radiation. The cured low refractive index polymeric composition may comprise copolymerization reaction products of A) and B). The cured low refractive index polymeric composition is surmised to also comprise polymerization products of B). The fluoro(meth)acrylate polymer intermediate may covalently bond to other components within the low refractive index coating composition. Further, other optional components of the low refractive index coating, such as non-fluorinated crosslinker, may polymerize physically entangling the fluoro(meth)acrylate polymer intermediate thereby forming an interpenetrating network.

The A) fluoro(meth)acrylate polymeric intermediate comprises the reaction product of i) at least one fluorinated multi-(meth)acrylate monomer having a fluorine content of at least about 25 wt-%; and ii) optionally one or more multi-(meth) acrylate materials having a fluorine content ranging from 0 to less than 25 wt-%. Accordingly, the fluorine content of the multi-(meth)acrylate material of ii) is less than i). The optional multi-(meth) acrylate material may include monomer(s), oligomer(s), polymer(s), surface modified inorganic nanoparticles having free-radically polymerizable moieties, as well as the various combinations of such materials. The total amount of multi-(meth)acrylate materials is generally at least 25 wt-% based on wt-% solids of the polymerizable organic composition The fluoro(meth)acrylate polymer intermediate solution is surmised to comprise a mixture of unreacted free-radically polymerizable starting materials, oligomeric species, and polymeric species having a hyperbranched structure.

A two-step process is employed to prepare the low refractive index composition. A first (e.g. solution) polymerization reaction utilizes dilute organic solvent conditions to form a hyperbranched fluoroacrylate polymer (e.g. a nanogel). The hyberbranched fluoroacrylate is then utilized as a reactant in a second (e.g. photo) polymerization reaction under substantially 100% solids conditions to form the fluorinated crosslinked system that is surmised an interpenetrating network of the (nanogel) polymer in a crosslinked (meth)acrylate host.

For the preparation of the fluoro(meth)acrylate polymer intermediate, a single low index fluorinated multi-(meth) acrylate monomer can be homopolymerized. Alternatively, two or more low refractive index fluorinated multi-(meth) acrylate monomer(s) can be copolymerized with each other. Further yet, one or more low refractive index fluorinated multi-(meth)acrylate monomers can be copolymerized with other non-fluorinated and/or fluorinated mono- and multi-(meth)acrylate materials. The fluorinated mono-(meth) acrylate materials may also have a high fluorine content (i.e. at least 25 wt-%).

In yet another aspect, one or more low refractive index fluorinated multi-(meth)acrylate monomers can be copolymerized with surface modified inorganic nanoparticles having multi-(meth)acrylate functionality.

In some embodiments A), B) or a combination thereof, comprises at least one non-fluorinated crosslinker having at least three (meth)acrylate groups. Typically, A) includes at least 5 wt-% and less than 15 wt-% (e.g. about 10 wt-%) of non-fluorinated crosslinker. Further, B) may include at least 5 wt-% and less than 30 wt-% (e.g. about 25 wt-%) of non-fluorinated crosslinker. B) generally includes no greater than 30 wt-% non-fluorinated crosslinker. Hence, the total amount of non-fluorinated crosslinker may range from about 10 wt-% to about 30 wt-%.

In some embodiments, the total amount of multi-(meth) acrylate material, e.g. the sum of fluorinated and non-fluorinated multi-(meth)acrylate monomers, is at least 30 wt-%, 40 wt-%, 50 wt-%, 60 wt-%, 70 wt-%, 80 wt-%, 90 wt-% and even 100% based on the total solids of the organic portion on the reaction mixture. The total amount of low refractive index fluorinated multi-(meth)acrylate (i.e. having a fluorine content of at least about 25 wt-%) may be at least 30 wt-%, 40 wt-%, 50 wt-%, 60 wt-%, 70 wt-%, 80 wt-%, 90 wt-% and even 100% based on the total solids of the organic portion of the reaction mixture (i.e. excluding any inorganic nanoparticle).

The fluorinated (meth)acrylate monomer of component B) may be the same as or different than the fluorinated multi-(meth)acrylate monomer of component A) employed to prepare the fluoro(meth)acrylate intermediate. In at least some embodiments, B) also comprises a fluorine content of at least 25 wt-%.

At least one free-radical initiator is typically utilized for the preparation of the polymerizable low and high refractive index coating compositions. Useful free-radical thermal initiators include, for example, azo, peroxide, persulfate, and redox initiators, and combinations thereof. Useful free-radical photoinitiators include, for example, those known as useful in the UV cure of acrylate polymers. In addition, other additives may be added to the final composition. These include but are not limited to resinous flow aids, photostabilizers, high boiling point solvents, and other compatibilizers well known to those of skill in the art.

The high and low refractive index polymerizable compositions can be formed by dissolving the free-radically polymerizable material(s) in a compatible organic solvent at a concentration of about 1 to 10 percent solids. A single organic solvent or a blend of solvents can be employed.

Thin films of the antistatic primer, high refractive index layer, and low refractive index layer can be applied using a variety of techniques, including dip coating, forward and reverse roll coating, wire-wound rod coating, spin coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

Typically, the high index layer and low index layer are sequentially applied and cured to crosslink polymerizable components therein. Alternatively, these layers may be concurrently applied. The low and high refractive index coating compositions are dried in an oven to remove the solvent and then cured for example by exposure to ultraviolet radiation using an H-bulb or other lamp at a desired wavelength, preferably in an inert atmosphere (less than 50 parts per million oxygen). The exposure to ultraviolet causes the free-radically polymerizable materials to crosslink. Alternatively, the high and low refractive index coating may be applied to a release liner, at least partially cured, and transfer coated.

The optical and antireflective films described herein are suitable for application to optical displays ("displays"). The displays include various illuminated and non-illuminated display panels. Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches.

The optical and antireflective films can be employed with a variety of portable and non-portable information display articles. These articles include, but are not limited to, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection television screens, computer monitors, notebook computer displays, instrument gauges, and instrument panel covers. These devices can have planar or curved viewing faces.

The optical and antireflective films can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, as well as optical and magneto-optical recording disks, and the like.

The antireflective film may also be applied to a variety of other articles including (e.g. retroreflective) signage and commercial graphic display films employed for various advertising, promotional, and corporate identity uses.

While the invention has been described in terms of preferred embodiments, it will be understood, of course, that the invention is not limited thereto since modifications may be made by those skilled in the art, particularly in light of the foregoing teachings.

EXAMPLES

Test Methods

The following tests were performed to evaluate the adhesion, antistatic efficacy, and optical properties of the optical films and antireflective films.
Optical Property Measurements % Reflectance—was measured using a Lambda 900 UV/Vis/NIR spectrometer (Perkin Elmer, Waltham, Mass.). Each % reflectance is a single measurement recorded by the spectrometer.

High index hardcoat (HIHC) coating solution was prepared according to US 20060147674. Briefly, 94.1 g of dipentaerythritol pentaacrylate (SR 399, Sartomer, Exton, Pa.), 16.1 g of Irgacure 184, and 246.6 g of MEK were added to a 2 L container. The mixture was stirred until homogenous. Then 735.1 g of 3-(methacryloyloxy)propyltrimethoxysilane modified zirconia sol (as described in paragraph 0111 of U.S. Patent Publication 2007/0286994 except that the concentration was 59.2% wt in methoxypropanol) was added slowly to the mixture and gently mixed, resulting in a homogenous coating solution.
Preparation of Optical Films Comprising PET Substrate, Primer, and High Refractive Index Layer Solutions of Bostick Vitel 1200B (RI=1.59 as determined by ellipsometry) in 1,3-dioxolane were prepared at the concentrations indicated in the following Table. These primer solutions were coated on unprimed PET film using the indicated wire wound coating bar. The coated PET film (RI=1.64 as determined by ellipsometry) was air dried to produce coated polyester having primer thicknesses that increased from Primer Coating 1 to Primer Coating 5. The total reflection of the resulting primer coated polyester film for the various primer thicknesses are depicted in FIG. 5.

| Primer Coating | Coating Bar | Wt-% solids | Wavelength of % Reflectance Maximum |
|---|---|---|---|
| 1 | 3 | 3.50 | 429 |
| 2 | 3 | 4.15 | 550 |
| 3 | 3 | 4.85 | 628 |
| 4 | 4 | 4.15 | 446 |
| 5 | 4 | 4.65 | 497 |

The actual thickness of the primer was calculated according to Macleod, H Angus 2001 *Thin-Film Optical Filters* Third edn (New York: Taylor and Francis), p. 49, and are reported in the following table:

| Primer Coating | Modeled Primer Thickness |
|---|---|
| 1 | 150 nm |
| 2 | 175 nm |
| 3 | 200 nm |
| 4 | 310 nm |
| 5 | >390 nm |

Primer Coating 2 was air dried for a few minutes and then overcoated with the high index hardcoat (HIHC) using a #12 wire coating rod, from 40% solids solution. The HIHC coating was oven dried for 2 minutes at 100° C. The % reflectance of the primer coated polyester film in comparison to this same primer-coated film further comprising a high index hardcoat coated onto the primer is depicted in FIG. 6.

As is evident by FIG. 6 the maximum reflectance of the primer coated light transmissive substrate corresponds with the null in the interference fringing (i.e. the minimum wave amplitude) of the primer coated light transmissive substrate having the high index hardcoat (HIHC) layer. When this primer coated substrate is overcoated with a low index index layer to produce an antireflective (AR) film, this null in the fringing is also evident in the antireflective film.

What is claimed:

1. A method of reducing the optical fringing of a coated substrate comprising providing a substrate;

applying a primer to the substrate forming a primer layer having a thickness of at least x/4 wave divided by the refractive index of the primer, wherein x is an even integer of at least 2, and such that the primer layer in combination with the substrate has a percent reflectance at a maximum at a wavelength ranging from 500 nm to 600 nm; and disposing a high refractive index layer, having a refractive index of at least 1.60, on the primer layer; wherein the primer layer has a refractive index less than the substrate by at least 0.05 and less than the high refractive layer.

2. The method of claim 1 wherein the method comprises coating the primer on the substrate at increasing thicknesses, measuring the percent reflectance of the primer coated substrate with a spectrophotometer, and selecting the primer thickness wherein the percent reflectance maximum is closest to 550 nm.

3. The method of claim 1 wherein the substrate is a light transmissive substrate.

4. A method of reducing the optical fringing of a coated substrate comprising
providing a substrate;
applying a primer to the substrate forming a primer layer having a thickness of at least x/4 wave divided by the refractive index of the primer, wherein x is an odd integer of at least 3, and such that the primer layer in combination with the substrate has a percent reflectance at a maximum at a wavelength ranging from 500 nm to 600 nm; and
disposing a high refractive index layer, having a refractive index of at least 1.60, on the primer layer; wherein the primer layer has a refractive index between the light transmissive substrate and the high refractive layer.

5. The method of claim 4 wherein the primer has a refractive index equal to (refractive index of high refractive index layer+refractive index of substrate)/2.

6. An article comprising
a substrate;
a primer layer disposed on the substrate;
and a high refractive index layer, having a refractive index of at least 1.60, disposed on the primer layer;
wherein the primer layer
  i) has a refractive index less than the high refractive index layer by at least 0.05
  ii) has a refractive index less than the substrate by at least 0.05, and
  ii) has a thickness of at least x/4 wave divided by the refractive index of the primer wherein x is an even integer of at least 2 and such that the primer layer in combination with the substrate has a percent reflectance at a maximum at a wavelength ranging from 500 nm to 600 nm.

7. The article of claim 6 wherein the substrate is a light transmissive substrate.

8. The article of claim 6 wherein the wavelength is 550 nm.

9. The optical article of claim 6 wherein the high refractive index layer comprises surface modified inorganic nanoparticles dispersed in a crosslinked organic material.

10. The article of claim 6 wherein the substrate is a polymeric material selected from the group consisting of polyethylene terephthalate, polyethylene naphthalate, polycarbonate, cellulose acetate, poly(methyl methacrylate), and combinations thereof.

11. The article of claim 6 wherein the article is an antireflective film further comprising a low refractive index layer disposed on the high refractive index layer.

12. The article of claim 6 wherein the primer is a polymeric material substantially free of inorganic particles.

13. The article of claim 6 wherein a hardcoat layer is disposed between the primer and the high refractive index layer.

14. An article comprising
a substrate;
a primer layer disposed on the substrate;
and a high refractive index layer, having a refractive index of at least 1.60, disposed on the primer layer;
wherein the primer layer
  i) has a refractive index less than the high refractive index layer by at least 0.05
  ii) has a refractive index greater than the substrate by at least 0.05, and
  ii) has a thickness of at least x/4 wave divided by the refractive index of the primer wherein x is an odd integer of at least 3 and such that the primer layer in combination with the substrate has a percent reflectance at a maximum at a wavelength ranging from 500 nm to 600 nm.

15. The article of claim 14 wherein the substrate is a light transmissive substrate.

16. The article of claim 14 wherein the primer has a refractive index equal to (the refractive index of high refractive index layer+the refractive index of substrate)/2.

17. The article of claim 14 wherein the wavelength is 550 nm.

18. The article of claim 14 wherein the high refractive index layer comprises surface modified inorganic nanoparticles dispersed in a crosslinked organic material.

19. The article of claim 14 wherein the substrate is a polymeric material selected from the group consisting of polyethylene terephthalate, polyethylene naphthalate, polycarbonate, cellulose acetate, poly(methyl methacrylate), and combinations thereof.

20. The article of claim 14 wherein the article is an antireflective film further comprising a low refractive index layer disposed on the high refractive index layer.

21. The article of claim 14 wherein the primer is a polymeric material substantially free of inorganic particles.

22. The article of claim 14 wherein a hardcoat layer is disposed between the primer and the high refractive index layer.

* * * * *

UNITED STATES PATENT AND TRADEMARK OFFICE
CERTIFICATE OF CORRECTION

| | |
|---|---|
| PATENT NO. | : 8,611,010 B2 |
| APPLICATION NO. | : 12/241310 |
| DATED | : December 17, 2013 |
| INVENTOR(S) | : Marc Radcliffe et al. |

It is certified that error appears in the above-identified patent and that said Letters Patent is hereby corrected as shown below:

In the Specification:

Column 3
Line 2, After "("AR"" insert -- ) --.

Column 6
Line 57, Delete ""Adcote 61WG178"." and insert -- "Adcote61WG178". --, therefor.
Line 67, Delete "Incos" and insert -- Ineos --, therefor.

Column 7
Line 46, Delete "sulfonapthalene" and insert -- sulfonaphthalene --, therefor.
Line 60, Delete "napthalene" and insert -- naphthalene --, therefor.

Column 8
Line 12, Delete "may used" and insert -- may be used --, therefor.

Column 9
Line 39, Delete "wt %" and insert -- wt-% --, therefor.

Column 11
Line 59, Delete "Collodial" and insert -- Colloidal --, therefor.

Column 12
Line 44, Delete "know" and insert -- known --, therefor.

Column 15
Line 20, After "composition" insert -- . --.
Line 29, Delete "hyberbranched" and insert -- hyperbranched --, therefor.

Signed and Sealed this
First Day of July, 2014

Michelle K. Lee
*Deputy Director of the United States Patent and Trademark Office*

CERTIFICATE OF CORRECTION (continued)
U.S. Pat. No. 8,611,010 B2

Column 17
Line 48, Delete "Bostick" and insert -- Bostik --, therefor.

Column 18
Line 39, After "index" delete "index".

In the Claims:

Column 19
Line 27, In Claim 6, delete "ii)" and insert -- iii) --, therefor.
Line 36, In Claim 9, after "The" delete "optical".

Column 20
Line 17, In Claim 14, delete "ii)" and insert -- iii) --, therefor.